July 26, 1966 — F. ZANDMAN — 3,263,199

BENDING-STRAIN TRANSDUCER

Filed Oct. 25, 1960

INVENTOR.
Felix Zandman.
BY
ATTORNEY

United States Patent Office 3,263,199
Patented July 26, 1966

3,263,199
BENDING-STRAIN TRANSDUCER
Felix Zandman, Rosemont, Pa., assignor to The Budd Company, Philadelphia, Pa., a corporation of Pennsylvania
Filed Oct. 25, 1960, Ser. No. 64,757
2 Claims. (Cl. 338—2)

This invention pertains to a strain-gauge transducer for the generation of information related to bending strains developed in a workpiece and, more particularly, to an integral transducer requiring access to but a single surface of a workpiece for its application and yielding differential strain gauge output information related directly to workpiece bending strain gradients.

In many areas of engineering analysis, bending strain information is required for interpretation of loaded workpiece reactions. The generation of such information is relatively simple when strain gradients can be calculated from bonded resistance strain gauge measurements taken at opposite sides of a workpiece. It has been, however, extremely difficult, and in some cases impossible, to acquire meaningful bending information when access can be had to but one surface of a loaded workpiece. Prior approaches to the solution of this problem have employed dual strain gauge arrays wherein the first strain gauge was bonded to a workpiece surface and the second was bonded to a bridging element, spaced from the same workpiece surface, and attached at its ends to the workpiece. These arrays were difficult and time consuming in application and subject to numerous inaccuracies, primarily due to environmental variations between the strain gauge positions. (See Boodberg A., and E. D. Howe: Method of Obtaining the Stress of the Mid-thickness by Measurements from Only One Surface of a Plate, Proc. SESA, vol. V, No. 1, 1947).

Therefore, the general object of this invention is to provide an improved, integral, bending-strain transducer which is convenient and inexpensive, and which yields accurate and precise information directly related to workpiece bending deformations.

According to an illustrated embodiment of this invention, the improved bending-strain transducer comprises a base strip of an elastic insulating material, a first resistance strain gauge bonded to the upper side of the strip, and a second resistance strain gauge bonded to the lower side of the strip; the first and second strain gauges are substantially similar, parallel oriented, and subtend substantially the same area of the base strip. Further, according to this invention, the bending-strain transducer is integrally attached to the workpiece by means of a continuous layer of a bonding medium substantially co-extensive with the entire lower surface of the transducer whereby both workpiece surface dimension changes and workpiece surface contour changes are enforced upon the transducer.

While the invention is particularly pointed out and distinctly claimed in the claims appended to this specification, the invention and further objects and advantages thereof will be better understood from the following description taken in conjunction with the drawing wherein:

Figure 1:
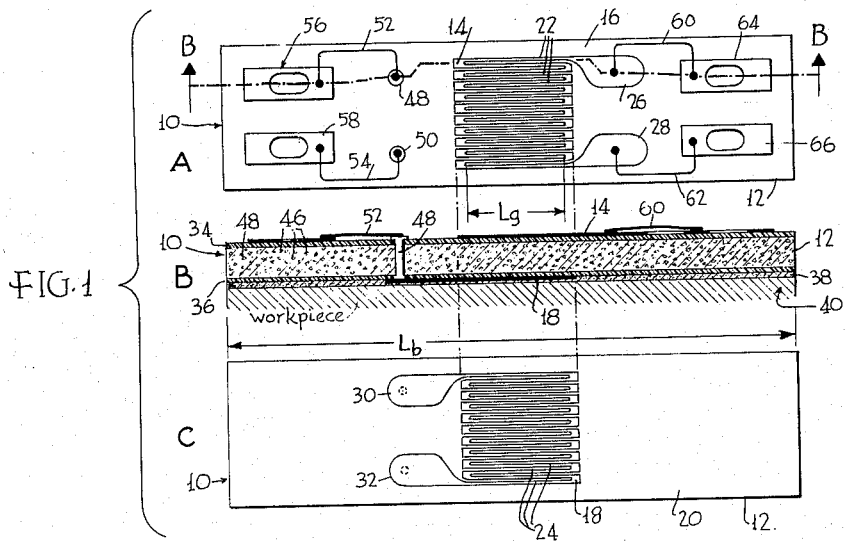
FIG. 1 illustrates a bending strain transducer according to this invention.

With particular reference to FIG. 1, the top view A, cross section B, and bottom view C, depict a bending-strain transducer 10 which comprises, according to this invention, an insulating strip-form base 12, a first bonded resistance strain gauge 14 integrally attached to upper surface 16 and a second similar strain gauge 18 integrally attached to lower surface 20 of base 12. The thickness dimensions of FIG. 1B are exaggerated for clarity since the strain gauges 14 and 18 are but a few thousandths of an inch thick while the thickness of base 12 varies from about .020″ to .100″ as designed for specific applications.

Preferably, strain gauges 14 and 18 are similar, of the foil type for minimum thickness, and each has a sensitive length $L_g$ defined by parallel filaments 22 and 24, which extend serially between the corresponding integral gauge terminals 26 and 28, 30 and 32. The gauges may be bonded directly to base 12, or they may be formed on intermediate insulator strips 34 and 36, as shown, which are, in turn, bonded to base 12. It is important, however, that the gauges 14 and 18 are mutually parallel, subtend the same area of base 12, and have their sensitive lengths $L_g$ parallel with the base length $L_b$. Thereafter, the resistance of each gauge is a direct function of strains impassed upon the gauge filaments. These resistance variations may, of course, be sensed and recorded by means of conventional strain gauge readout equipment.

Figure 2:
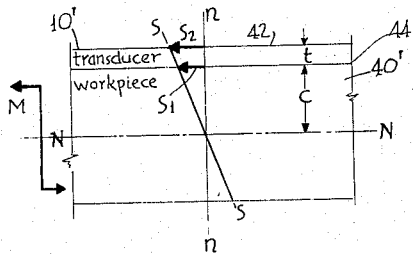
FIG. 2 and FIG. 3 are diagrams useful in explaining gauge and workpiece strain relationship in applications of the transducer of FIG. 1.
Figure 3:
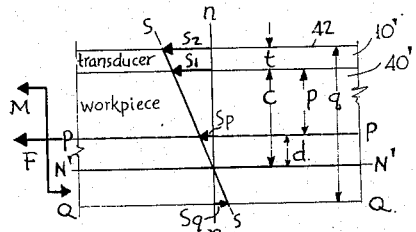

Before additional details of the FIG. 1 embodiment are described, it will be helpful to illustrate its application and function by reference to the diagrams of FIGS. 2 and 3. Here, the transducer is represented at 10′ as bonded to a workpiece 40′. In FIG. 2, a moment M generates bending deformation relative to a neutral surface N, N; in the FIG. 3, a tensile load F has been added to shift the neutral surface to position N′, N′. Vector $s_1$ represents the strain sensed by the lower gauge (18) at the interface 44 between workpiece 40′ and trandsucer 10′, vector $s_2$ represents the strain sensed by the upper gauge (14) at transducer surface 42, spaced a distance $t$ from interface 42. It follows that the strain gradient $G_s$ within transducer 10′ is given by:

$$G_s = (s_2 - s_1)/t \qquad (I)$$

Assuming this gradient to be maintained within workpiece 40′, the depth $c$ of the unstressed surface NN is given by:

$$c = s_1/G = s_1/(s_2 - s_1)/t \qquad (II)$$

For the case of FIG. 3, the strain $s_p$ at any given depth $p$, here the location of the medial plane PP, may be found from:

$$s_p = G_s(c - p) = (c - p)(s_2 - s_1)/t \qquad (III)$$

At a depth $q$, here the location of lower workpiece surface QQ, the strain $s_q$ is:

$$s_q = G_s(c - q) = (c - q)(s_2 - s_1)/t \qquad (IV)$$

and since $(c - q)$ is a negative quantity the strain $s_q$ is opposite to upper surface strain $s_1$, compressive for the diagrammed example.

With further reference to FIG. 1, precision of relationships I to IV depends upon continuation of strain gradient $G_s$ through workpiece and transducer. This is assured according to this invention by unique configuration and elastic properties of transducer base 12. The base 12 is of a plastic solid and completely fills the volume between strain gauges 14 and 18 or intermediate strips 34 and 36. This assures that strain gauge surfaces 16 and 20 and hence gauges 14 and 18, will deform concentrically and, in itself, is a major advance over prior expedients wherein one gauge strain is that of a chord and the other that of an arc of a workpiece surface deformation.

The base length $L_b$ is made sufficiently long relative to the gauge length $L_g$ to insure that isoclinic strain surfaces are equally displaced within the section of the base subtended by strain gauges 14 and 18. In other words, end effects are dissipated outside of the gauge-subtended volume. This is possible because workpiece strains are imposed upon the transducer by sheer stress concentrations which vary from maximum at the base ends to very nearly zero at interior distances from the ends which exceed about five times the base thickness.

Further, the base is comprised of an elastically deformable material having a modulus of elasticity much less than that of the workpiece so that a base thickness may be chosen relative to workpiece thickness whereby reinforcement of the workpiece is either insignificant or sufficiently small to be precisely correctable by insertion of determinable factors of equations I to IV above. For use with metal workpieces having elastic moduli of about $3 \cdot 10^6$ lbs./in.$^2$ the elastic modulus of the base should be about $3 \cdot 10^4$ lbs./in.$^2$, or on the order of 1% of that of the workpiece. This feature substantially eliminates errors ordinarily introduced by the assumption that measured quantities are unaffected by the measuring instrument.

In order for the resistance variations of strain gauges 14 and 18 to be related precisely to strain variations, additional unique variable and electrical properties are prescribed for base 12 in the preferred embodiment of this invention. Electrical resistance between gauge surfaces 16 and 20 should be a maximum to eliminate shunting of gauge resistance sensing currents. Simultaneously, however, thermal resistance between gauge positions should be a minimum to eliminate temperature difference effects upon the strain gauges.

Sufficient electrical insulation requires but a few thousandths of an inch of plastic separator between gauge surfaces and such a minute separation could prevent accumulation of significant temperature differences. However, the sensitivity of the transducer 10 is a function of the gauge separation $t$ and it would be reduced below practical limits before obviation of temperature problems by this expedient. The problem has been solved successfully according to this invention by distributing highly conductive metal particles 46 throughout the insulating plastic material 48 of base 12. The plastic paths between particles provide for effective electrical insulation, while shunting conduction paths through the particles 46 minimize thermal resistance even though total separation $t$ between gauge surfaces is made large for optimum sampling of the projected strain gradient G.

These desirable properties are provided for base strip 12 by the use of a low modulus of elasticity, high electrical resistance, plastic, such as a polycarbonate, into which oxidized metal particles, such as aluminum particles, have been introduced. The preferred oxidized aluminum particles, even if contacting in a direct chain between gauging surfaces, are sufficiently inherently electrically insulated to prevent significant shunting current conduction between the superimposed strain gauges 14 and 18.

With continuing reference to FIG. 1, additional constructional features contribute to overall ruggedness and economy without sacrifice of precision. Intermediate leads from lower strain gauge 18 are partially formed by solder columns 48 and 50, extended through base 12 from tabs 30 and 32. These intermediate leads are completed by conductors 52 and 54 soldered, in turn, to stress relief connectors 56 and 58. The latter are of the printed circuit type and are bonded to the transducer. Intermediate leads 60 and 62 for gauge 14 are soldered directly between gauge tabs 26, 28 and connectors 64, 66. This arrangement allows for soldering of external circuit leads to be accomplished in the field without effect upon the previously formed solder joints of the intermediate leads. The terminals 56, 58 and 64, 66 are bonded near the ends of base 12 so that external circuit lead stresses are dissipated without effect upon gaged strains.

As pointed out above, all portions of transducer 10 are bonded together to form an integral laminate and in application, the transducer is further bonded to a workpiece 40 as by an insulating strain gauge adhesive layer 38 applied over the large bonding area subtended by base 12 so that the transducer becomes in effect an integral extension of the workpiece. Advantages which accrue from such integration include reduction of gauge creep, hysteresis, and zero shift, besides the obvious elimination of air gaps which contribute to temperature problems.

Figure 4:
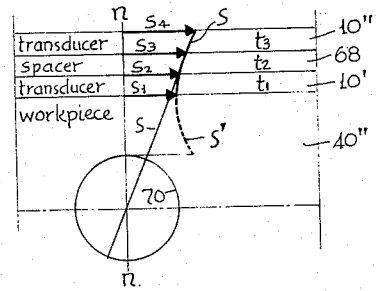
FIG. 4 illustrates, schematically, a further development of the transducer of FIG. 1 for detection of non-linear strain gradients.

For those workpiece investigations where a nonlinear workpiece strain gradient is suspected, two or more of the bending strain transducer units of FIG. 1 may be superimposed as illustrated schematically in FIG. 4 with an additional spacer strip 68 laminated between each pair 10' and 10" of transducers. This composite laminate is then bonded to the workpiece as before. As diagramed, successive individual strain gauge readings will then yield strain vectors $s_1$, $s_2$, $s_3$, and $s_4$ which may be plotted to a uniform scale at displacements $t_1$, $t_2$, and $t_3$ representing predetermined spacings between planes of the several strain gauges. Here, the workpiece 40" is assumed to include a void 70 which produces a stress concentration within the workpiece as illustrated by dashed curve $s'$. The shape of curve $s'$ may be predicted by projection of a curve $s$ drawn through the ends of vectors $s_1$ to $s_4$.

Even in those cases where linear workpiece strain gradients, only, are expected, the redundant information of the composite transducer is useful for increasing precision of an investigation and in corroborating expected gradient linearity.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:
1. A bending strain transducer for the investigation of strain gradients imposed upon a workpiece, said transducer comprising first and second similar bonded resistance strain gauges having equal gauge lengths, an elongated base separator strip of a plastic material having a modulus of elasticity less than the modulus of elasticity of the workpiece, said plastic material having a dispersion of metal particles therein, said base strip having a uniform thickness and a predetermined base length exceeding said gauge lengths by at least ten times said thickness, said gauges being bonded symmetrically upon opposite surfaces of said base strip with their respective gauge lengths paralleling said base length and subtending the same portion of said base strip, and means substantially coextensive with a gauged surface of said transducer bonding said transducer to said workpiece throughout the area of one surface of the workpiece subtended by said base strip.

2. The transducer of claim 1 wherein said particles are oxidized aluminum particles and said plastic is a polycarbonate plastic.

References Cited by the Examiner
UNITED STATES PATENTS

| | | | |
|---|---|---|---|
| 2,400,467 | 5/1946 | Ruge | 338—4 |
| 2,626,338 | 1/1953 | Mitchell | 338—2 |
| 2,722,587 | 11/1955 | Buzzetti et al. | 338—2 |
| 2,885,524 | 5/1959 | Eisler | 338—2 X |

(Other references on following page)

UNITED STATES PATENTS

| 2,920,298 | 1/1960 | Hines | 73—88.5 X |
| 3,005,170 | 10/1961 | Starr | 338—2 |

OTHER REFERENCES

National Bureau of Standards Circular 528, issued Feb. 15, 1954, Subject: Characteristics and Applications of Resistance Strain Gages; pp. 45–48.

Perry and Lissner's "The Strain Gage Primer"; pp. 246-7-8, 1955.

RICHARD M. WOOD, *Primary Examiner.*

ANTHONY BARTIS, MARCUS U. LYONS, *Examiners.*

W. M. ASBURY, H. T. POWELL, W. D. BROOKS,
*Assistant Examiners.*